Feb. 9, 1926.
K. B. FISKE
1,572,783
OVEN
Filed Jan. 30, 1925
4 Sheets-Sheet 3

K. B. Fiske
INVENTOR
BY Victor J. Evans
ATTORNEY

WITNESS:

Feb. 9, 1926.

K. B. FISKE 1,572,783

OVEN

Filed Jan. 30, 1925

K. B. Fiske
INVENTOR

BY Victor J. Evans
ATTORNEY

WITNESS:

Patented Feb. 9, 1926.

1,572,783

UNITED STATES PATENT OFFICE.

KENNETH B. FISKE, OF CHICAGO, ILLINOIS.

OVEN.

Application filed January 30, 1925. Serial No. 5,873.

*To all whom it may concern:*

Be it known that I, KENNETH B. FISKE, a citizen of the United States, residing at Chicago, in the county of Cook and State of Illinois, have invented new and useful Improvements in Ovens, of which the following is a specification.

This invention relates to improvements in ovens adapted for use with gas or electricity and has for an object the provision of an oven which includes a plurality of separate baking units capable of being nested one above the other.

Another object of the invention is the provision of an oven of this character in which the baking units provide means for supplying fresh air to the heating chambers to aid combustion when gas is used as a heating agent and to prevent the accumulation or stagnation of dead air and thus render the air more readily heated, provision being made for preheating the air before it enters the heating chamber so as not to lower the temperature.

Another object of the invention is the provision of an oven in which the door of the baking chamber is so constructed and arranged as to prevent the escape of heat from the baking chamber while provision is made for yieldingly holding the door in place to permit the latter to open for the release of pressure from the baking chamber in the event of an explosion.

Another object of the invention is the provision of means for balancing the door of the baking chamber so as to provide ease of operation and for utilizing the balancing means to operate an electric switch so as to automatically illuminate the interior of the baking chamber when the door is opened.

With the above and other objects in view, the invention further includes the following novel features and details of construction, to be hereinafter more fully described, illustrated in the accompanying drawings and pointed out in the appended claims.

In the drawings:—

Figure 1:
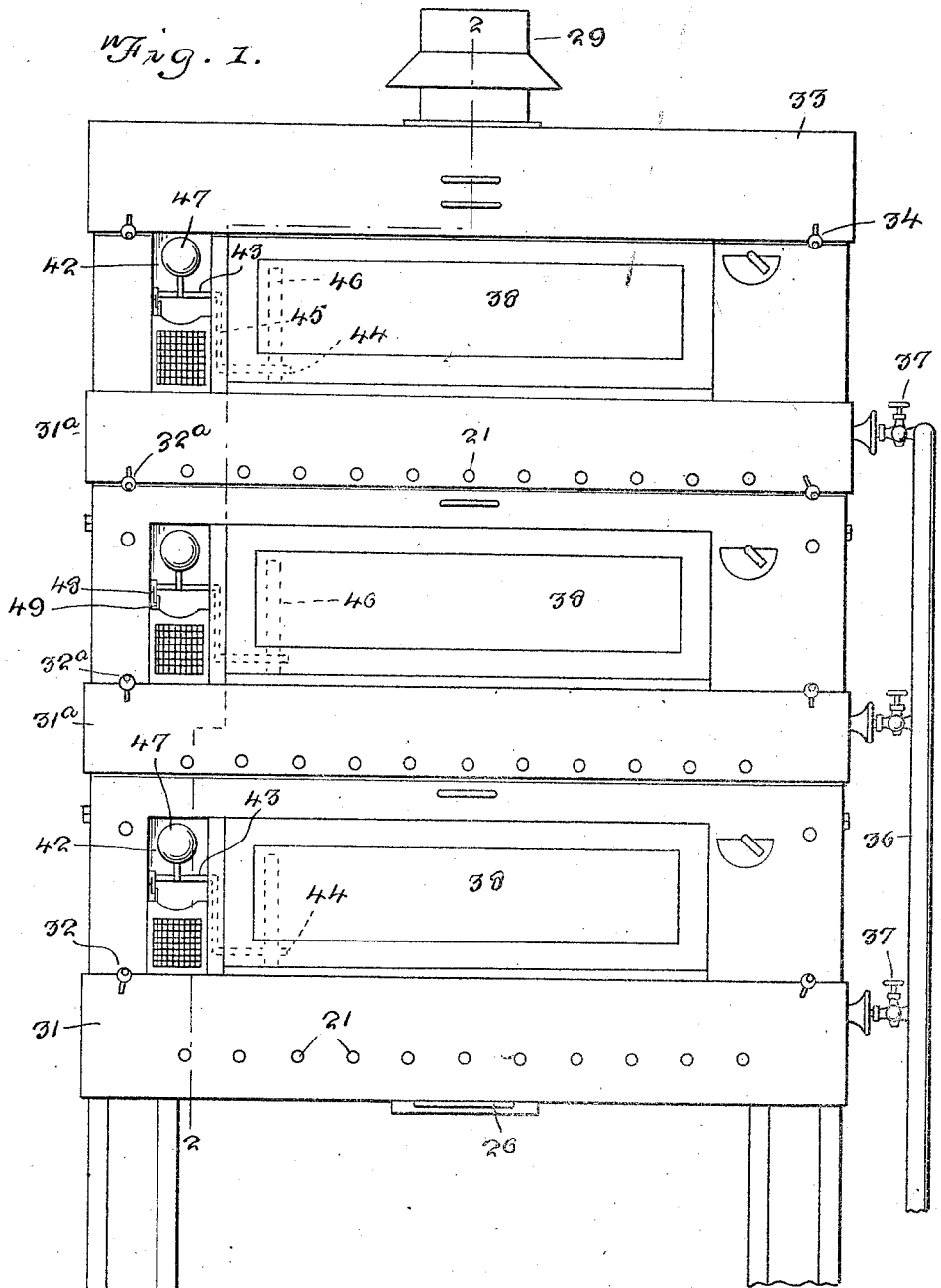
Figure 1 is a front elevation of an oven constructed in accordance with the invention.
Figure 2:
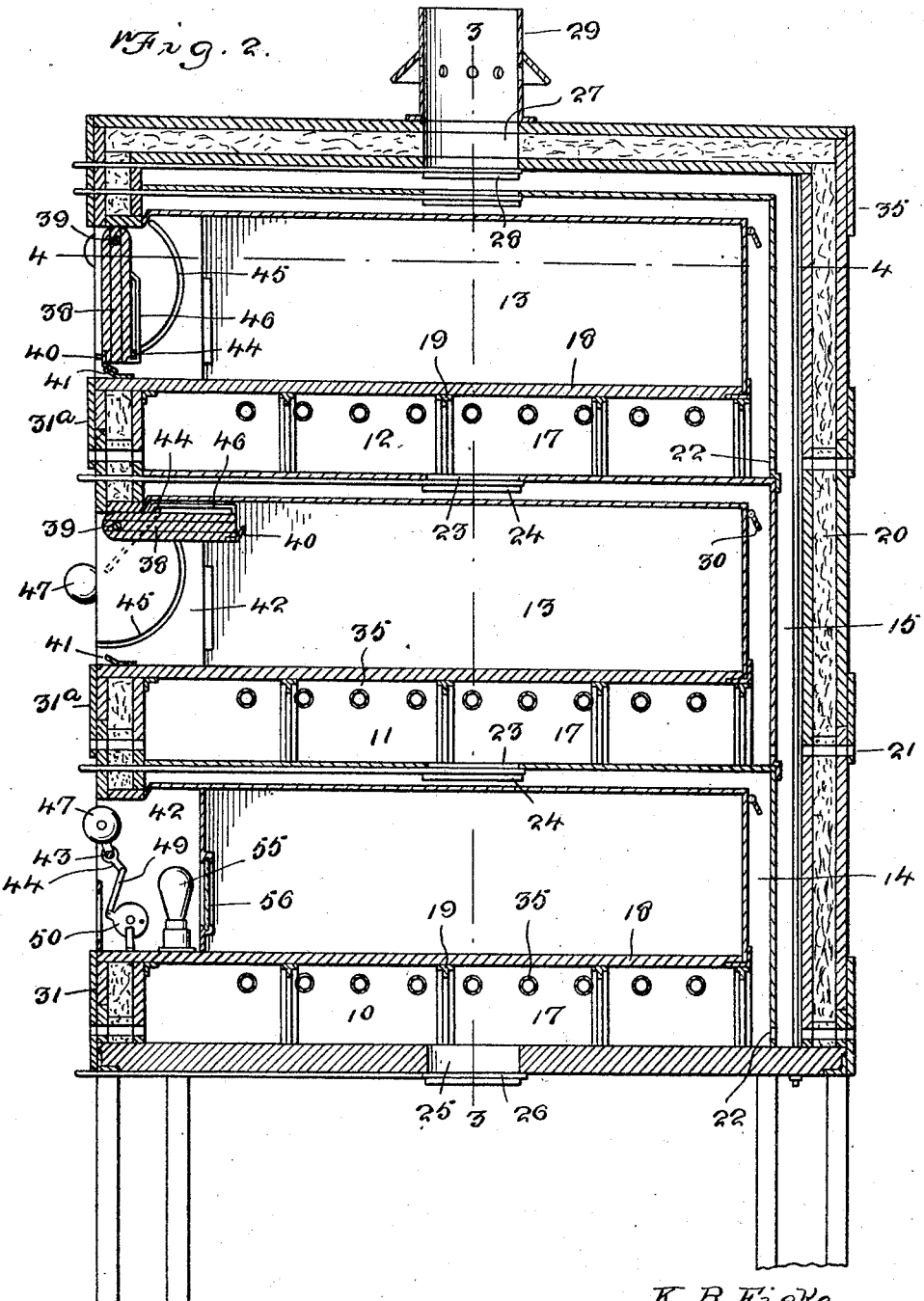
Figure 2 is a section taken substantially on the line 2—2 of Figure 1.
Figure 3:
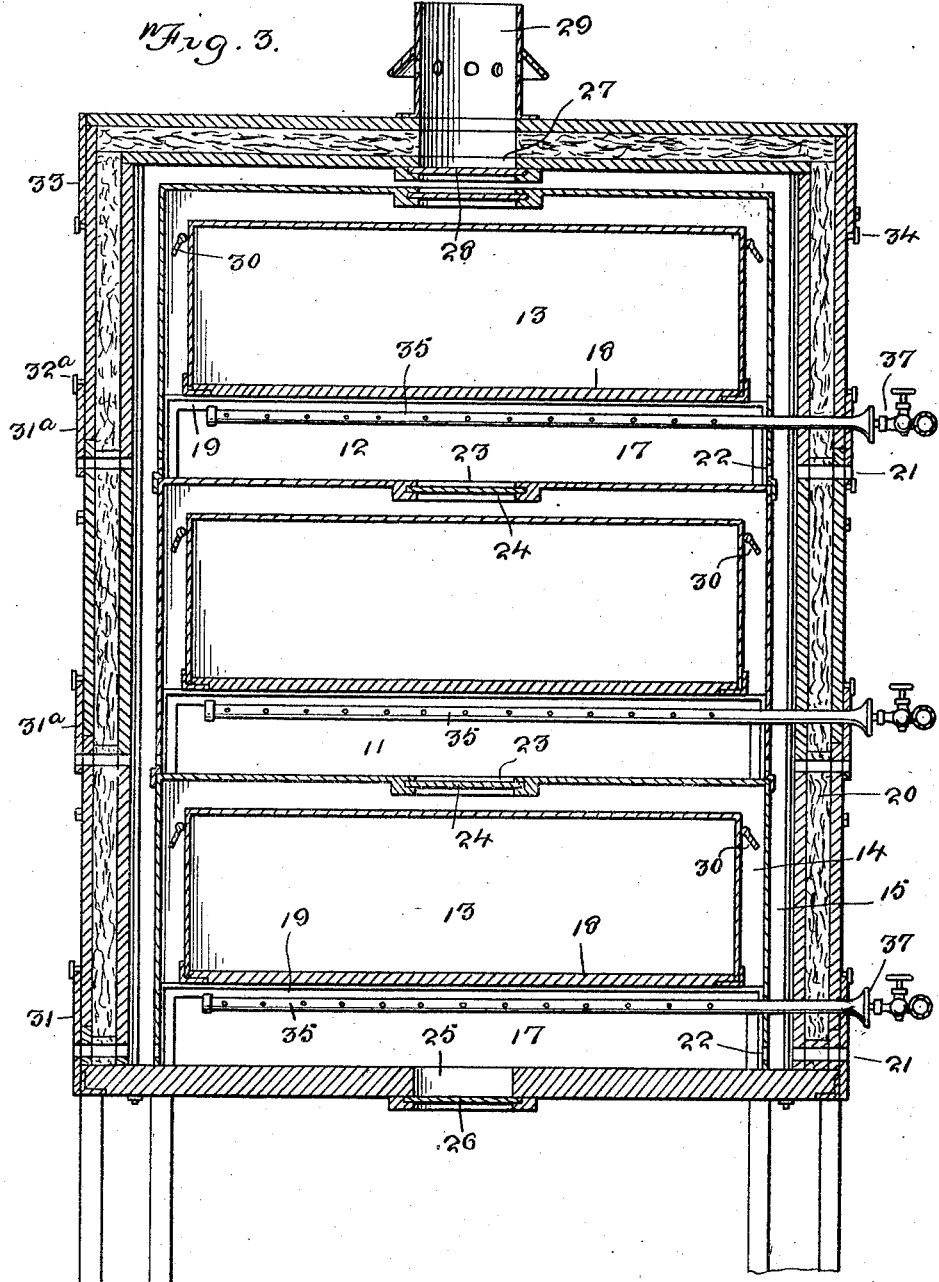
Figure 3 is a similar view on the line 3—3 of Figure 2.
Figure 4:
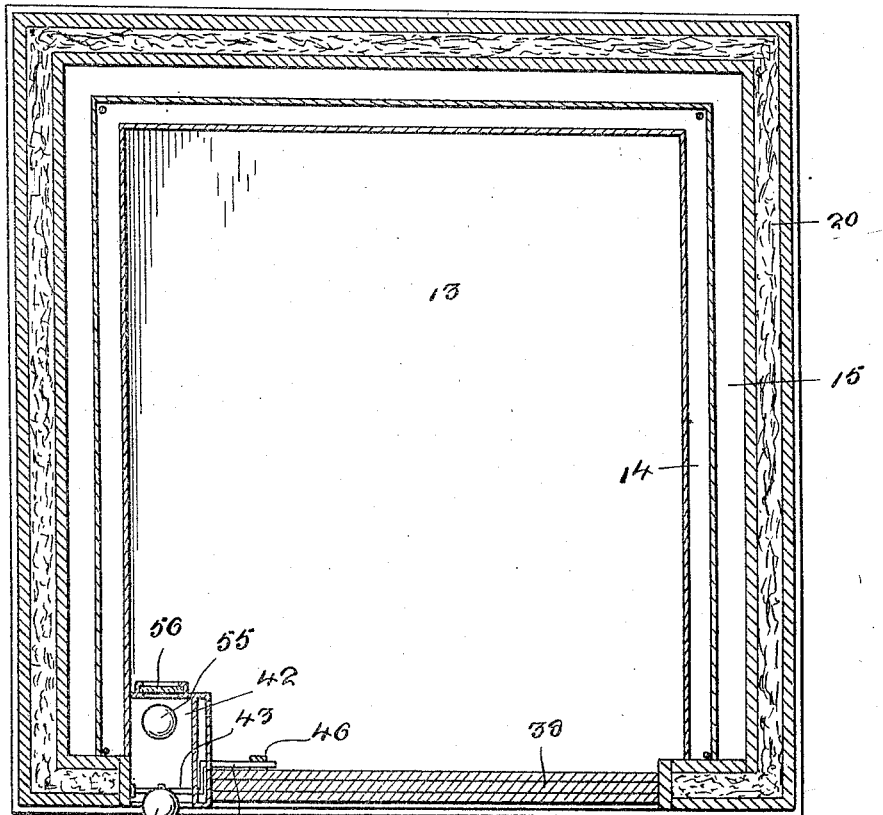
Figure 4 is a horizontal section on the line 4—4 of Figure 2.
Figure 5:
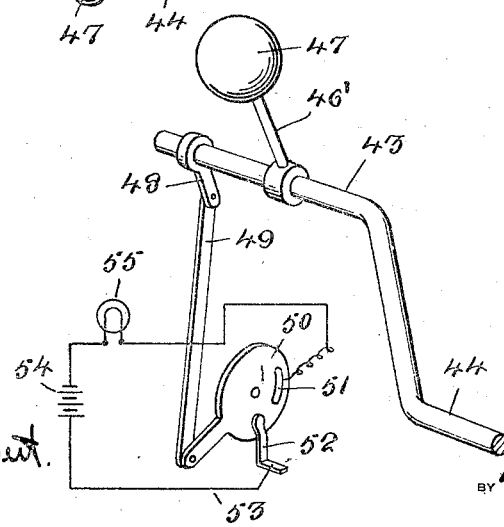
Figure 5 is a fragmentary perspective view illustrating the counterbalance and the electric switch operated thereby.

Referring in detail to the drawings wherein like characters of reference denote corresponding parts, the oven as shown comprises a plurality of separate baking units 10, 11 and 12. The numeral 10 indicates the bottom unit, 11 the top unit and 12 the intermediate unit and while only one intermediate unit is shown any number may be employed, or if desired, the top unit may rest directly upon the bottom unit.

All of the units are substantially the same, each including a baking chamber 13, an inner circulating chamber 14 and an outer circulating chamber 15, while a heating chamber or compartment 17 is located below the baking chamber for the accommodation of the heating agent. The bottoms 18 of the baking chambers are preferably formed of a rock composition so as to retain the heat and these chambers are supported upon transversely T-shaped brackets or supports 19. The circulating chamber 14 which communicates with the heating chamber or compartment 17 thus provides for a circulation entirely around the baking chamber, while the outer circulating chamber 15 surrounds the chamber 14. The outer wall of the chamber 15 which forms the oven casing is provided with an insulating lining 20 of asbestos or other suitable material. This wall is provided with air inlet openings 21 in each baking unit for the supply of fresh air to the heating chamber or compartment 17, the air entering this compartment through openings 22 provided in the wall which separates the chambers 14 and 15. The air entering through the openings 21 is first subjected to heat within the outer circulating chamber so that it enters the heating chamber or compartment 17 and the inner circulating chamber 14 in a preheated state and does not lower the temperature of the oven.

The heating units are nested one upon the other so that the outer circulating chambers of each unit communicate, while communication between the inner circulating chambers 14 is established through openings 23 which are controlled by slide dampers 24. The bottom unit 10 is provided with an opening 25 which is controlled by a damper 26, while the top unit 11 is provided with an outlet opening 27 which is controlled by a damper 28. The opening 27 is surrounded by one end of a pipe 29. Dampers 30 provide for the regulation of heat circulation through the inner circulating chambers 14.

The base or bottom of the bottom baking unit 10 is surrounded by a flange 31, the openings 21 extending through this flange while the bottom unit 10 is seated within the flange and is secured thereto by pivotally movable eccentric clamps 32. Each succeeding baking unit is provided with a flange 31ᵃ and eccentric clamps 32ᵃ, while the top unit is provided with a cap 33 which is clamped in place by eccentric clamps 34.

The burners are indicated at 35 and gas is supplied to these burners through a manifold 36, while valves 37 serve to control each burner.

Each baking chamber 13 is provided with a door 38 which is mounted upon a hinge bar 39 so that it may swing both inward and outward. The lower edge of the door is provided with a spring closure strip 40 which engages a similar strip 41 located along the bottom of the baking chamber. These strips form a stop which ordinarily limits the outward swinging movement of the door, but when undue force is exerted upon the inside of the door, such as would be occasioned by an explosion within the oven, these strips will give and the door will be forced outward so as to release pressure from within the oven. The doors are of a relatively heavy character and in order to counterbalance the doors and render their operation easy, there is pivotally mounted in a compartment 42 at one side of each baking unit, a shaft 43. Extending from one end of this shaft is a crank arm 44 which operates through an arcuate slot 45 provided in one wall of the compartment 42. The inner end of the crank arm 44 operates within a loop or guide 46 carried by the door. Extending from the shaft 43 is an arm 46' at the outer end of which there is provided a counterbalance weight 47, the position of this weight acting to balance the door so as to render its operation easy.

Also secured to the shaft 43 is an arm 48 and this arm is connected by means of a rod or link 49 with a rotatable disk 50. The disk 50 carries an electric contact member 51 and located in the path of this contact member is a spring contact member 52. The members 51 and 52 are included in a circuit 53 which also includes a battery 54 and a lamp 55, the latter being located within the compartment 42. The inner wall of the compartment 42 is provided with a glass covered opening 56 and when any of the doors 38 are swung inward its shaft 43 will be rocked so as to actuate the switch and close the circuit 53 to light the lamp 55. The interior of the baking chamber will then be illuminated.

The invention is susceptible of various changes in its form, proportions and minor details of construction and the right is herein reserved to make such changes as properly fall within the scope of the appended claims.

Having described the invention what is claimed is:—

1. In an oven, a plurality of separate baking units, each of said units including a baking chamber, a heating chamber located below the baking chamber, an inner circulating chamber around the baking chamber, an outer circulating chamber around said inner chamber, said outer chamber communicating with the inner chamber and having air inlet openings in its outer wall, means whereby the baking units may be assembled to provide communication between the inner and outer circulating chambers of each unit, means for controlling such communication and damper controlled outlets for the inner and outer circulating chambers.

2. In an oven, a door mounted for swinging movement in opposite directions, whereby the door may open either inward or outward and yieldable means located in the path of the door for normally limiting outward swinging movement.

3. In an oven, a door mounted for swinging movement in opposite directions, whereby the door may open either inward or outward, a resilient member extending outwardly from one edge of the door and a resilient member located within the oven in the path of the first mentioned member, whereby outward swinging movement of the door will be yieldingly resisted.

In testimony whereof I affix my signature.

KENNETH B. FISKE.